(12) United States Patent
DuKane

(10) Patent No.: US 8,969,700 B2
(45) Date of Patent: Mar. 3, 2015

(54) SYSTEMS AND METHODS OF SELECTION, CHARACTERIZATION AND AUTOMATED SEQUENCING OF MEDIA CONTENT

(71) Applicant: Michael K. DuKane, Woodinville, WA (US)

(72) Inventor: Michael K. DuKane, Woodinville, WA (US)

( * ) Notice: Subject to any disclaimer, the term of this patent is extended or adjusted under 35 U.S.C. 154(b) by 0 days.

(21) Appl. No.: 13/890,118

(22) Filed: May 8, 2013

(65) Prior Publication Data

US 2013/0332457 A1 Dec. 12, 2013

Related U.S. Application Data

(63) Continuation of application No. 12/790,740, filed on May 28, 2010, now abandoned, which is a continuation of application No. 11/109,455, filed on Apr. 18, 2005, now abandoned.

(51) Int. Cl.
| | |
|---|---|
| G04B 13/00 | (2006.01) |
| G10H 1/36 | (2006.01) |
| G06F 17/30 | (2006.01) |
| G11B 27/034 | (2006.01) |
| G11B 27/10 | (2006.01) |
| G11B 27/32 | (2006.01) |

(52) U.S. Cl.
CPC .... *G06F 17/30053* (2013.01); *G06F 17/30056* (2013.01); *G06F 17/30743* (2013.01); *G06F 17/30749* (2013.01); *G06F 17/30752* (2013.01); *G06F 17/30772* (2013.01); *G11B 27/034* (2013.01); *G11B 27/105* (2013.01); *G11B 27/322* (2013.01)

USPC ............... 84/612; 84/609; 84/610; 84/634; 84/649; 84/650; 84/652; 84/666

(58) Field of Classification Search
None
See application file for complete search history.

(56) References Cited

U.S. PATENT DOCUMENTS

| | | | |
|---|---|---|---|
| 6,987,221 B2 * | 1/2006 | Platt ............................... | 84/601 |
| 7,196,258 B2 * | 3/2007 | Platt ............................... | 84/600 |
| 7,521,623 B2 * | 4/2009 | Bowen ........................... | 84/612 |
| 7,705,230 B2 * | 4/2010 | Bowen ........................... | 84/612 |
| 7,973,231 B2 * | 7/2011 | Bowen ........................... | 84/612 |
| 2003/0221541 A1 * | 12/2003 | Platt ............................... | 84/609 |
| 2005/0235811 A1 * | 10/2005 | Dukane .......................... | 84/612 |
| 2006/0032363 A1 * | 2/2006 | Platt ............................... | 84/601 |
| 2006/0107822 A1 * | 5/2006 | Bowen ........................... | 84/612 |
| 2007/0074617 A1 * | 4/2007 | Vergo ............................. | 84/612 |
| 2007/0074618 A1 * | 4/2007 | Vergo ............................. | 84/612 |
| 2007/0074619 A1 * | 4/2007 | Vergo ............................. | 84/612 |
| 2007/0221045 A1 * | 9/2007 | Terauchi et al. ............... | 84/609 |
| 2007/0254271 A1 * | 11/2007 | Burlik et al. .................. | 434/247 |
| 2009/0049979 A1 * | 2/2009 | Naik et al. ..................... | 84/636 |
| 2009/0139389 A1 * | 6/2009 | Bowen ........................... | 84/636 |
| 2010/0186578 A1 * | 7/2010 | Bowen ........................... | 84/612 |
| 2011/0016394 A1 * | 1/2011 | DuKane ........................ | 715/716 |
| 2011/0179943 A1 * | 7/2011 | Bowen ........................... | 84/612 |
| 2013/0332457 A1 * | 12/2013 | DuKane ........................ | 707/737 |

\* cited by examiner

*Primary Examiner* — Marlon Fletcher
(74) *Attorney, Agent, or Firm* — Richard C. Vershave; Foster Pepper PLLC

(57) ABSTRACT

In a computer system having at least one output device, a set of media programs is accessed. A playlist first portion including a first plurality of the media programs of the set is created. The programs of the first portion are arranged with respect to one another according to a respective first characteristic value of each of the programs of the first portion.

17 Claims, 7 Drawing Sheets

The Composer

540 Artists
- O Alternate
- O Group
- O Any Order

530 Genre
- O Alternate
- O Group
- O Any Order

520 Cycle Length
- O 20 min.
- O 30 min.
- O 60 min

EVALUATE 550

COMPOSE 560

| Title | Artist | Time |
|---|---|---|
| Tequila Sunrise | The Eagles | 2:53 |
| | O | |
| | O | |
| | O | |
| The Gambler | Kenny Rogers | 3:44 |

SYSTEMS AND METHODS OF SELECTION, CHARACTERIZATION AND AUTOMATED SEQUENCING OF MEDIA CONTENT

PRIORITY CLAIM

This application is a continuation of U.S. patent application Ser. No. 12/790,740, filed May 28, 2010, which is a continuation of U.S. patent application Ser. No. 11/109,455 filed on Apr. 18, 2005 and claims priority to U.S. Provisional Application No. 60/564,157 filed Apr. 20, 2004, which are incorporated by reference in their entireties as if fully set forth herein.

BACKGROUND OF THE INVENTION

From the time that gramophone recordings were first sold to the public until the distribution of music recordings became dominated by Internet download technology, users have organized their collections of music recordings simply by organizing the media objects themselves—78s, 45 singles, 33⅓ long play albums, 8-track tape cartridges, cassette tapes, and compact disks—and by mechanically placing these physical objects into a playback machine in a sequence. By placing many songs on a single recording medium, the recording industry provided an intermediate level of organization with 20 minutes to 45 minutes of music recordings in a sequence recorded on the recording media.

However, with the advent of digital file-sharing and similar services, audiophiles are now acquiring large numbers of individual music recordings of one to five minutes in length. Because hard disk storage has become inexpensive, audiophiles are building libraries of thousands of these recordings. The intermediate level of organization previously provided by the recording industry is not available. The listener must make approximately 15 to 30 selection decisions for each hour of music played.

SUMMARY

According to an embodiment of the invention, in a computer system having at least one output device, a set of media programs is accessed. A playlist first portion including a first plurality of the media programs of the set is created. The programs of the first portion are arranged with respect to one another according to a respective first characteristic value of each of the programs of the first portion.

BRIEF DESCRIPTION OF THE DRAWINGS

FIG. 5 is a schematic view of a second GUI according to an embodiment of the invention;

DETAILED DESCRIPTION

Figure 1:
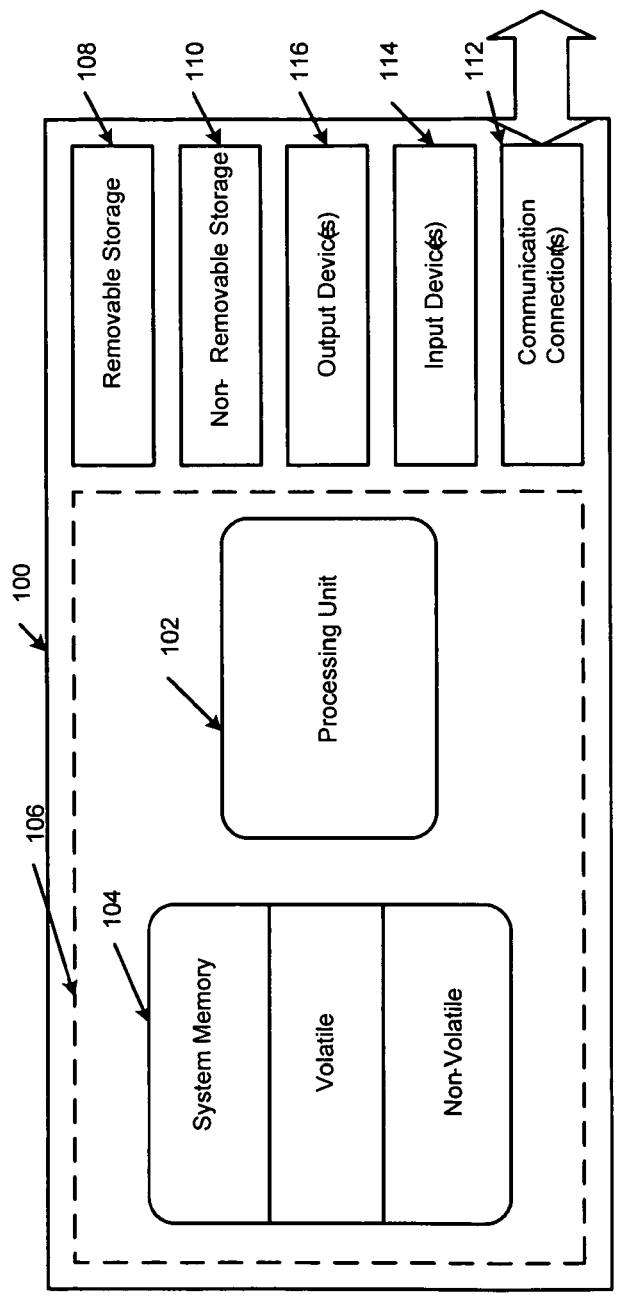
FIG. 1 is a schematic view of an exemplary operating environment in which an embodiment of the invention can be implemented.

An embodiment of the invention described herein includes a system for listener characterization of music recordings and automated play selection. The music recordings may be stored in a library. Each recording has associated metadata consisting of attributes that characterize the recording, and the metadata may be stored in a database component. The system includes a sophisticated search engine that can search the database for values of each attribute for each recording to find recordings of interest. As an adjunct to the search engine, the system includes a component that selects a list of recordings to be played, called a "playlist". Another component of the system, called a "composer", automatically organizes recordings in the play list into a preferred play order.

The system includes a player component that can cause the recordings of the selected play order to be played from the library through audio reproduction components. The system includes a component for selecting one or more images to be stored in association with each audio recording. The images can be displayed on a video display while the music is playing or printed.

Instead of playing the recordings of a play list in real time, the recording data may be copied to another recording medium, such as a compact disk (CD) through use of a CD "burner". While the recordings are being burned to a CD, the system can print labels for the CD and for a jewel case to surround the CD by automatically copying titles and other attributes from the database to a printer. At the same time, this system can automatically take images associated with one or more of the recordings being burned and print the images on the disk label or jewel case label.

An important component of the system is the component that selects a play order from a play list. Without this component, the user must make all of the sequence decisions, roughly 15 to 30 decisions for each hour of music. If the user must make these decisions without computer assistance, enough time, effort, and thoughtful consideration is required that, once a play list has been selected and placed into a play order, the user will be motivated to hear that play list over and over rather than invest the time in selecting a new play list and placing it into a desired play order. Consequently, an automated system that can quickly place any play list into a desirable play order has considerable value for the consumer.

To place a play list into a play order, each recording in the play list must have metadata attributes ("profiles") that can be used by the composer component. There are prior art systems where such attributes are selected and values are assigned for each attribute by a music expert. By this process, the expertise of the expert is placed into a computerized expert system. However, the experts do not agree on how music recordings should be characterized, either to determine the important attributes or to set values for each attribute. Further, each individual listener will have his own tastes, preferences, values, and prejudices for characterization of music recordings.

The system solves the lack of congruity between the characterizations given by any expert and the characterizations that a particular listener would be inclined to use by allowing the user to make all of the characterizations and then using the user's characterizations in the composer. Provided the user is consistent when assigning characterizations to music recordings, the problem of lack of congruity between the characterizations given by an expert and the characterizations that the user would give is eliminated. It does not matter whether the words chosen by the user for characterizing a recording would have the same meaning for another person that they have for the user—all that is required is that the user be consistent. Then, when the user specifies a characterization for a database search or for play list selection or for input to the composer, these components of the system will work well together. The user can use words with a meaning that is quite different from conventional meanings, or even opposite from conventional meanings, or misspelled or made up words. The system will still work as intended provided the user applies these words consistently. In this sense, the user can be his own lexicographer.

The system can also be enhanced with an additional module for users who do not want to take the time to assign their own characterizations to each piece of music they add to their library. Instead, the user can download across a network metadata characterizations ("profiles") given to pieces of music by another person who publishes the profiles on the network. The user can download an entire library of music recordings that have been selected and characterized by the publisher or the user can select music recordings one at a time by browsing a database offered by the publisher. The user can subscribe to an announcement service from the publisher to receive offers of new music that the publisher has recently profiled for addition to the user's library.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a computing device, such as computing device 100. In its most basic configuration, computing device 100 typically includes at least one processing unit 102 and memory 104.

Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may have additional features/functionality. For example, device 100 may also include additional storage (removable and/or nonremovable) including, but not limited to, magnetic or optical disks or tape. Such additional storage is illustrated in FIG. 1 by removable storage 108 and nonremovable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Figure 2:
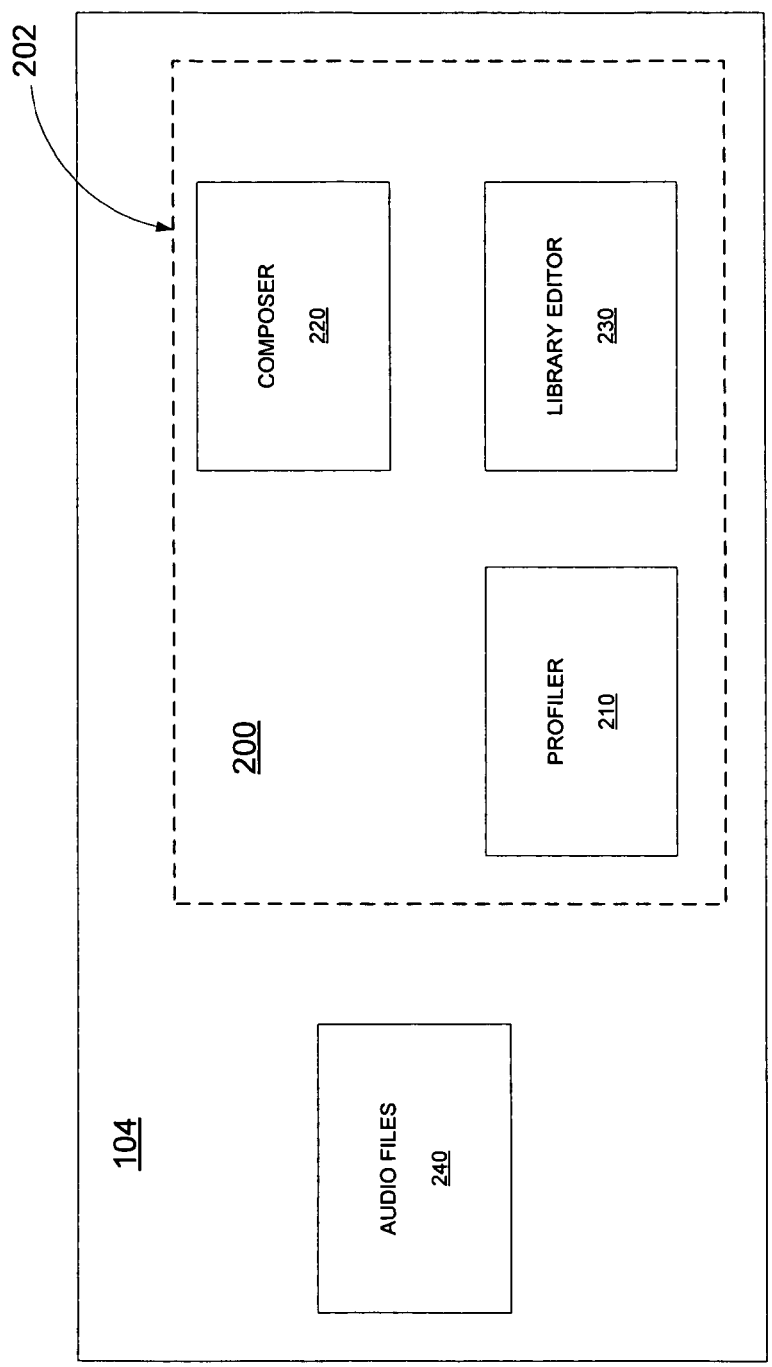
FIG. 2 is a functional block diagram of a system according to an embodiment of the invention.

FIG. 2 illustrates a system 200 according to an embodiment of the invention and delineated by a dashed line 202. In an embodiment, the system 200 includes a profiler module 210, a composer module 220 and a library editor module 230, each of which is stored in the memory 104. In operation, a user of the system 200 may access a set of audio files 240 stored in the memory 104. The audio files 240 may be stored in any appropriate format, such as MP3, .wav, and the like. Such access may be through a conventional interface (not shown) generated to the output device 116 that allows the user to navigate through and select from a menu displaying, for example, the titles of and other information associated with the audio files 240. Using a pointer device (not shown) associated with the input device 114, the user may select an audio file to profile, as described in greater detail below.

Figure 3:
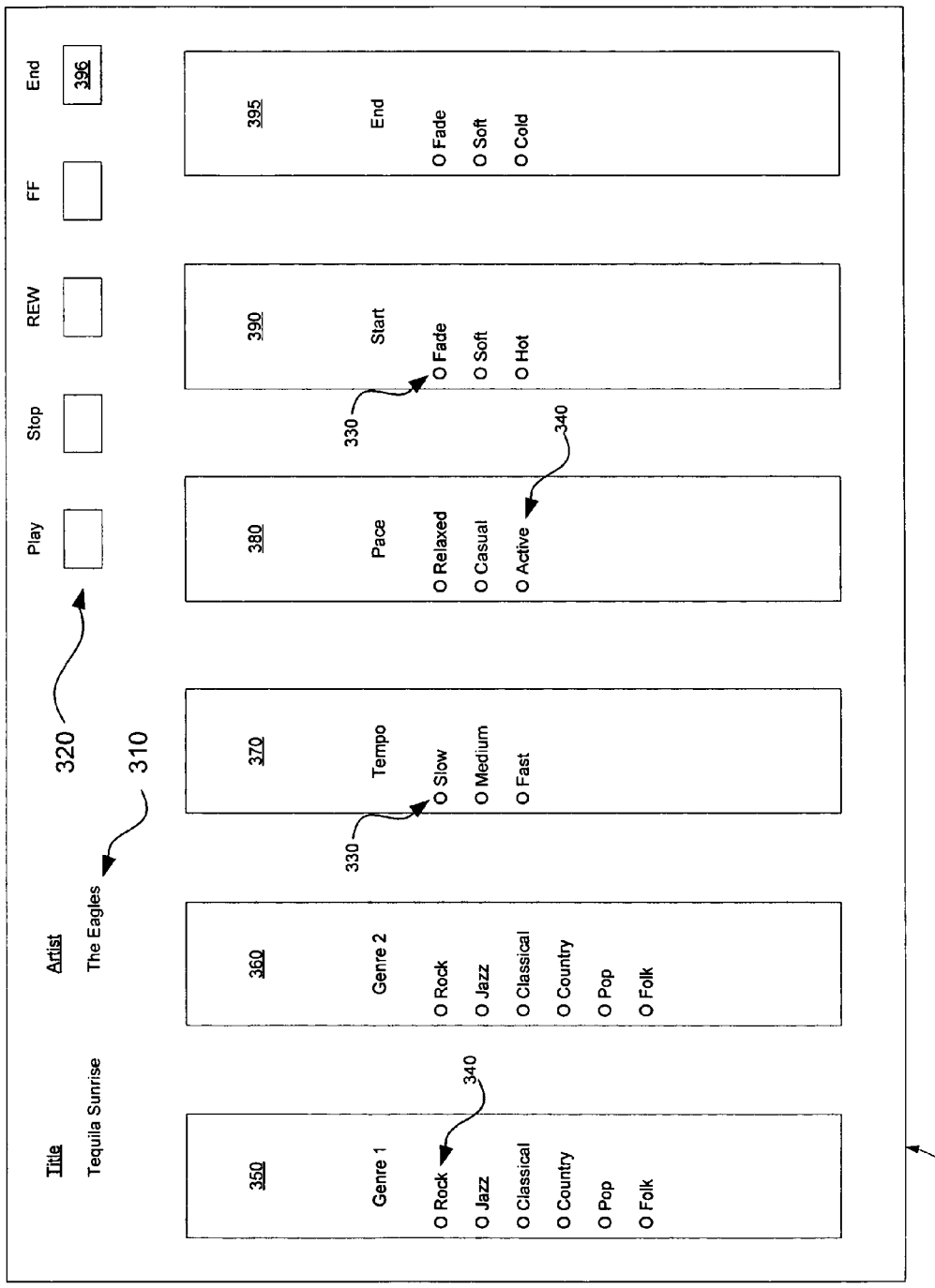
FIG. 3 is a schematic view of a first graphical user interface (GUI) according to an embodiment of the invention.

Upon selecting an audio file for profiling, a GUI 300, such as a dialog box illustrated in FIG. 3, may be displayed on an output device 116, such as a conventional display device. In an embodiment, the GUI 300 is operable to lead the user through a profiling interview in order to receive the user's opinions concerning certain attributes of the song associated with the selected audio file. For example, in the embodiment illustrated in FIG. 3, the GUI 300 includes a field 310 that displays the title and artist of the selected audio file and a set of play controls 320 that allow the user to listen to and analyze the selected audio file. The GUI 300 further functions to solicit from the user a detailed characterization of the song by having the user assign one or more attribute descriptions to the song. For example, the user is asked to enter, via selection of radio buttons 330, his or her perceptions concerning the genre(s) to which the user believes the song to belong, the manner in which the song begins and ends, and the overall pacing and tempo of the song. In characterizing these attributes, the user may choose from among several textual descriptions 340.

In a Genre1 selection menu 350, the user is asked to select the primary genre to which the song belongs. The user may believe that the song belongs to more than one genre. For example, a song belonging primarily to the Country genre may have successfully crossed over to the Pop genre after release. Accordingly, in a Genre2 selection menu 360, the user is given the option to select a secondary genre to which the song belongs.

In a Tempo selection menu 370, the user is asked to characterize the overall tempo of the song. The Tempo selection may be based on the user's perception of how fast or slow the music is. For example, if the user perceives the tempo as easy or minimal, the user may select Slow. If the user perceives the tempo as bouncy or moderate, the user may select Medium. If the user perceives the tempo as energetic or extreme, the user may select Fast.

In a Pace selection menu 380, the user is asked to characterize the overall pace of the song. The Pace selection may "fine tune" the Tempo attribute. For example, a song like Roberta Flak's "The First Time Ever I Saw Your Face" may be perceived to have a slow tempo and relaxed pace, while the Dixie Chicks' "Wide Open Spaces" has a slow tempo but a more casual pace. Furthermore, the Eagles' Tequila Sunrise" may be perceived to have a slow tempo with a more active pace than either one of these other two songs. As such, the Pace attribute may be used to modify the Tempo attribute up or down. For example, if the user perceives the pace as laid back or smooth, the user may select Relaxed. If the user perceives the pace as lively or leisurely, the user may select Casual. If the user perceives the pace as aggressive or rough, the user may select Active.

In a Start selection menu 390, the user is asked to characterize the beginning of the song. For example, if the user perceives the beginning of the song to be quiet or consist of dialog, the user may select Fade. If the user perceives the beginning of the song to be smooth or easy, the user may select Soft. If the user perceives the beginning of the song to be hard or strong, the user may select Hot.

In an End selection menu 395, the user is asked to characterize the end of the song. For example, if the user perceives the end of the song to be gradual or consist of dialog, the user may select Fade. If the user perceives the end of the song to be smooth or easy, the user may select Soft. If the user perceives the end of the song to be hard or intense, the user may select Cold. In an embodiment, the GUI 300 includes an End button 396 that, when activated, plays a final song portion of predetermined length to allow the user to evaluate the song's ending.

In an embodiment, each of the selectable textual attribute descriptions 340 corresponds to a numerical value that the profiler module 210 can use to profile the song. The following provides an exemplary set of attribute selections and corresponding numerical values employed by the profiler module 210.

| Tempo | |
|---|---|
| User Selection | Numeric Value |
| Slow | 40 |
| Medium | 80 |
| Fast | 120 |

| Pace | |
|---|---|
| User Selection | Numeric Value |
| Relaxed | 5 |
| Casual | 15 |
| Active | 25 |

| Start | |
|---|---|
| User Selection | Numeric Value |
| Fade | 5 |
| Soft | 1 |
| Hot | 7 |

| End | |
|---|---|
| User Selection | Numeric Value |
| Fade | 5 |
| Soft | 1 |
| Cold | 10 |

In an embodiment of the invention, the values corresponding to the attributes selected by the user are added to yield a value characterized as a perceived, but not necessarily actual, beats per minute (BPM) for the song. The following illustrates exemplary profiling by a user of two different songs:

| Song A | |
|---|---|
| Tempo = Slow | Value = 40 |
| Pacing = Casual | Value = 15 |
| Start = Soft | Value = 1 |
| End = Fade | Value = 5 |
| Perceived BPM = 61 | |

| Song B | |
|---|---|
| Tempo = Fast | Value = 120 |
| Pacing = Active | Value = 25 |
| Start = Soft | Value = 1 |
| End = Fade | Value = 5 |
| Perceived BPM = 151 | |

The user can repeat this profiling interview process for each of the audio files 240 stored in the memory 104. Alternatively, the user may import via the communication connection 112 over a network (not shown) a set of profiles, generated by another person or a commercial entity, for one or more of the audio files 240 stored in the memory 104. Once profiling has been applied to a song, the library editor 230 allows the user to later search for and locate the song by searching one or more of these attributes. The library editor 230 may further allow the user to alter the profiling selections earlier applied to a given song.

Although the GUI 300 illustrated in FIG. 3 employs radio buttons to allow user selections, the GUI could instead or additionally employ pop-up menus, pull-down menus, or any other suitable graphic dialog interface allowing the user to make the desired choices.

Having profiled and generated a perceived-BPM value for stored audio files 240, the user may then choose to generate a playlist including these audio files using features associated with the composer module 220. In an embodiment, the composer module 220 operates to generate the playlist as a series of listening cycles.

Figure 4:
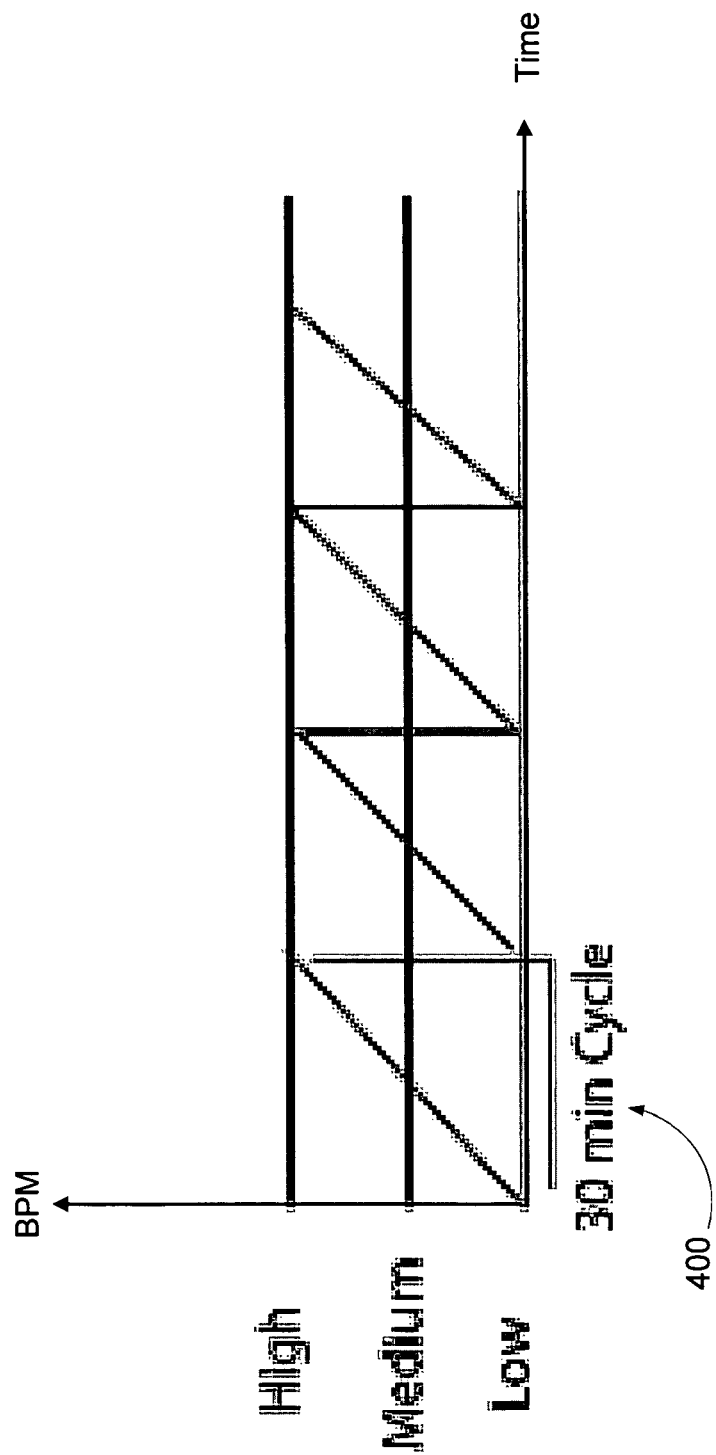
FIG. 4 is a graphical illustration of listening cycles according to an embodiment of the invention.

As best illustrated in FIG. 4, a listening cycle 400 may be a period of time within which a set of songs is arranged to be played in an order governed by a song parameter that changes from song to song in a progressive manner. For example, many people prefer that each listening cycle start with a song having a low tempo and end with a song having a high tempo. This is commonly referred to as saw-tooth programming. Radio stations and other broadcasting entities employ human programmers to arrange a set of songs into a listening cycle. In radio broadcasting this is typically a 20 minute cycle, the average time someone may be in their car when traveling from point A to point B. For listeners at home, the preferred listening cycle may be 30 minutes to 60 minutes.

In an embodiment, the composer module 220 builds a playlist that accelerates the BPM up until the end (high BPM) of a listening cycle and then starts the acceleration over at the beginning (low BPM) of a successive listening cycle. Once a high tempo is reached within a cycle, the composer module 220 begins a new listening cycle from a low tempo point. If a 60-minute listening cycle is selected, the BPM progression occurs over a 60-minute time frame. If a 30-minute listening cycle is selected, the BPM progression occurs over a 30-minute time frame.

The composer module 220 automates programming a play list based on the profile of each audio track to be included in the playlist and the predetermined listening cycle. The composer module 220 evaluates a potential playlist and breaks it down into listening cycles based on the selected length of the play list. Based on each track's profile, the composer module 220 then assigns each track to a specific position within a listening cycle.

In operation, and as illustrated in FIG. 5, the user first invokes a composer GUI 500 that, in an embodiment, allows the user to dictate the manner in which a playlist will be generated. For example, the GUI 500 may provide an audio track selection menu 510 that allows the user to view the profiled audio tracks available for inclusion in the playlist and select at least a subset of these tracks (i.e., playlist pool) from which the composer module 220 will draw in generating the playlist.

In an embodiment, the GUI 500 further provides a cycle-length radio-button menu 520, a genre radio-button menu 530, and an artist radio-button menu 540 that allow the user to select settings pertaining to the listening-cycle length and frequency of artist and genre appearance in the playlist. For example, the user's selection from the cycle-length menu 520 determines the listening cycle duration.

If the user chooses the "Alternate" setting in the artist menu 540, the composer module 220 will attempt to alternate artists as it positions each track. This avoids having the same artist play back to back in the play list. If the user chooses the "Group" setting in the artist menu 540, the composer module 220 will attempt to group tracks from the same artist together in the play list. The composer module 220 will deviate from the Group setting if the artist doesn't have an appropriate song in the playlist in accordance with the desired BPM in the cycle. If the user chooses the "Any Order" setting in the artist menu 540, the composer module 220 will disregard the artist when positioning tracks.

Similarly, if the user chooses the "Alternate" setting in the genre menu 530, the composer module 220 will attempt to alternate genres as it positions each track. This avoids having the same genre play back to back in the play list. If the user chooses the "Group" setting in the genre menu 530, the composer module 220 will attempt to group tracks from the same genre together in the play list. The composer module 220 will deviate from the Group setting if there is not an appropriate song from the genre in the playlist in accordance with the desired BPM in the cycle. If the user chooses the "Any Order" setting in the genre menu 530, the composer module 220 will disregard the genre when positioning tracks.

For purposes of explaining the functioning of an embodiment of the composer module 220, the following terminology is used:

Tempo Value—The BPM of a music or audio file (song file) whether perceived by a user of the system 200 or identified in some other manner and input into the system 200 as a numeric value by a user.

Listening Cycle—Defined as a period of time (usually 20, 30 or 60 minutes) that begins with a song file that represents a low numeric Tempo Value then ascends upward with each subsequent song file until the end of the Listening Cycle is reached.

Genre—An attribute category that identifies a song file as Rock, Pop, Classical, etc.

Genre ID—A specific Genre to be matched.

Collection—A group of song files selected by the user for the playlist pool, each of which has a Tempo Value.

Stdv—The standard deviation of the collection's Tempo Values as expressed as a numeric value.

Process Cycle—The number of Listening Cycles which have been processed.

Global—The last value assigned to a variable value in the Listening Cycle.

Elapsed Time—The amount of time which has passed since the beginning of the Listening Cycle.

The composer module 220 arranges a collection of audio files 240 selected by a user into a play order that conforms to the user-selected listening cycle. To achieve an acceptable listening cycle, the composer module 220 first evaluates the entire collection from which the playlist will be generated on a song by song basis. In an embodiment, the following attributes of each song are evaluated and tabulated by the application.

1. Tempo Value (Beats Per Minute)
2. Artist
3. Genre
4. Vocals
5. Run Time

The composer module 220 may then create a collection profile which consists of the following:

1. Aggregate of all song file Run Times.
2. The number of song files.
3. The Average Run Time per song file.
4. The Average number of song files per hour.
5. The lowest song file Tempo Value in the collection.
6. The highest song file Tempo Value in the collection.
7. The mean (middle or median) song file Tempo Value in the collection.
8. The average song file Tempo Value in the collection
9. The number of unique Artists in the collection.
10. The number of Genres in the collection and the number song files in each Genre.
11. The number of Male Vocals in the collection.
12. The number of Female vocals in the collection.
13. The number of Instrumental in the collection.

The composer module 220 stores the above evaluation data in memory 104 for referencing throughout the composition process.

After selecting the tracks to be included in the playlist, the user may then select an "Evaluate" button 550 included by the GUI 500. Upon selecting the "Evaluate" button 550, the composer module 220 will evaluate the selected tracks to determine their composition and generate the collection profile. The GUI 500 may then display the collection profile (not shown) to the user. After reviewing the collection profile, the user can select the artist, genre, and/or cycle-length options described above and select a "Compose" button 560 included by the GUI 500 to compose the playlist or select a "Cancel" button (not shown) to return to the track list to add or eliminate tracks from the playlist pool.

The composer module 220 creates listening cycles beginning with the first cycle and continuing until all song files from a collection have been assigned to a listening cycle. As many listening cycles as necessary to utilize all song files in the collection can be generated. Using the standard definition of standard deviation (the square root of the arithmetic mean of the squares of the deviations from the arithmetic mean), the composer module 220 repeatedly calculates the standard deviation of tempo values of all song files which are not assigned to a listening cycle and uses this calculated result to determine the tempo value of the next track for possible inclusion in the listening cycle.

According to an embodiment of the invention, the process begins with generation of the first listening cycle of the collection. Initially, the tracks in the collection are arranged according to ascending Tempo Value. For any songs that have the same Tempo Value, such songs are arranged alphabetically by Artist.

Each cycle, including the first cycle, starts with the song file not already allocated to the playlist and having the lowest Tempo Value. This insures that each cycle will start with a song having a Tempo Value that is equal to or higher than—never lower than—that of the starting song of the prior cycle. This promotes a general increase in average Tempo Value from one cycle to the next.

In an embodiment, for each iteration of placing a song file in a playlist position, the composer module 220 determines the standard deviation of Tempo Values of all song files which are not assigned to a listening cycle and uses a fraction of the standard deviation to compute the next preferred Tempo Value from the remaining song files. This computation consists of adding the appropriate fraction of the standard deviation to the value of the last assigned song file's Tempo Value which result is the next Tempo Value. The composer module 220 scans each remaining song file for a Tempo Value match (+ or −10 BPM, for example) to the computed result. The fraction of the standard deviation to be used may vary. For example, for a 60 minute cycle, one sixth of the standard deviation may be used. Alternatively, for a 30 minute cycle, one third of the standard deviation may be used.

A time modifier of Tempo Value may also be considered based on the Elapsed Time within the cycle. The composer module 220 may use at least the following exemplary formula, expressed in scripting code, to determine the next Tempo Value and subsequent track match to that Tempo Value:

If(List Cycle=30, If(Round(BPM StDev/3, 0)>7 and Round(BPM StDev/3, 0)<15, Round(BPM StDev/3, 0), If(Round(BPM StDev/2, 0)>7 and Round(BPM StDev/2, 0)<15, Round(BPM StDev/2, 0), Round(BPM StDev, 0))), If(Round(BPM StDev/6, 0)>3 and Round(BPM StDev/6, 0)<7, Round(BPM StDev/6, 0), If(Round(BPM StDev/5, 0)>3 and Round(BPM StDev/5, 0)<7, Round(BPM StDev/5, 0), Round(BPM StDev/4, 0)))) then If (Right(Global Cycle, 1)≠Right(Cycle Auto, 1) or Global Tempo Value>Lowest Point and Minute(Elapsed Time)≥00 and Minute(Elapsed Time)≤03 and Seconds(Elapsed Time)≤00 or Global Tempo Value>Lowest Point and Minute(Elapsed Time)≥30 and Minute(Elapsed Time)≤33 and Seconds(Elapsed Time)≤00 and List Cycle=30) then set next BPM Tempo Value to the lowest BPM Tempo Value then continue to Search for Match Else If(Global Artist≠Artist and Global Song≠Song_Title and BPM≥Global Tempo Value and BPM≤Global Tempo Value+If(Tempo Auto≤5, Tempo Auto*3, Tempo Auto*2) and Genre ID=Global Number1 or Global Artist≠Artist and Global Song≠Song_Title and BPM≥Global Tempo Value and BPM≤Global Tempo Value+BPM StDev and Genre ID=Global Number1 and Process Cycle>1 or Global Artist≠Artist and Global Song≠Song_Title and BPM≥Global Tempo Value and BPM≤Global Tempo Value+BPM StDev and Current Genre=Genre_2 and Process Cycle>1 or Global Artist≠Artist and Global Song≠Song_Title and BPM≥Global Tempo Value and BPM≤Global Tempo Value+BPM StDev and Process Cycle=3 or Artist Count=1 and Global Song≠Song_Title and BPM≥Global Tempo Value and BPM≤Global Tempo Value+If(Tempo Auto<5, Tempo Auto*3, Tempo Auto*2) and Genre ID=Global Number1 or Artist Count=1 and Global Song≠Song_Title and BPM≥Global Tempo Value and BPM≤Global Tempo Value+BPM StDev and Genre ID=Global Number1 and Process Cycle>1 or Artist Count=1 and Global Song≠Song_Title and BPM≥Global Tempo Value and BPM≤Global Tempo Value+BPM StDev and Current Genre=Genre_2 and Process Cycle>1 or Artist Count=1 and Global Song≠Song_Title and BPM≥Global Tempo Value and BPM≤Global Tempo Value+BPM StDev and Process Cycle=3) then If(BPM<Tempo Last and Minute(Elapsed Time)<59 and Minute(Elapsed Time)>33 or BPM<Tempo Last and Minute(Elapsed Time)<29 and Minute(Elapsed Time)>03) then a match was found and the matched song file is assigned to the open position in the cycle.

In the event no match is found, in an embodiment, the composer module 220 will set the next Tempo Value to the exact of the last Tempo Value and search for a match (+ or −10 BPM, for example). If no match is found, the composer module 220 will increment the next Tempo Value up by the appropriate fraction of the standard deviation until a match is found. If no match is found after 15 scans using the above formula, then the composer module 220 will assign the song file with the closest Tempo Value match to the Tempo Value of the last song plus the appropriate fraction of the standard deviation to the next position in the cycle.

The benefit of this approach is to maintain a relative increase from the lowest Tempo Value in the cycle to the highest Tempo Value in the cycle. The composer module 220 repeats this process from one listening cycle to another until the entire collection of song files has been positioned in the appropriate play order.

Because each cycle starts with the remaining song having the lowest Tempo Value, each subsequent cycle will start with a song having an equal Tempo Value or a higher Tempo Value than that of the prior cycle. Thus, the starting tempo and the average tempo from one cycle to the next will increase. Also, because a fraction of the standard deviation is used to compute the next preferred tempo, the highest tempo reached in any cycle will not be extreme compared to the starting tempo. Of course, if desired, the listening cycles could be arranged to provide a progressively descending overall tempo.

It should be noted that, while the composer module 220, in generating the playlist, takes into account the above-described artist and/or genre grouping preferences, other parameters could be used. For example, the tracks could be sorted according to other track characteristics, such as whether the track has male vocals, female vocals, or any vocals at all (e.g., instrumentals).

If the composer module 220 has difficulty positioning a track, an indicator, such as a red"?" (not shown), may be placed near the track's listing displayed in the GUI. The GUI allows the user to manually position or remove a track if the composer module 220 places the track in an undesirable position or can't place the track.

Figure 6:
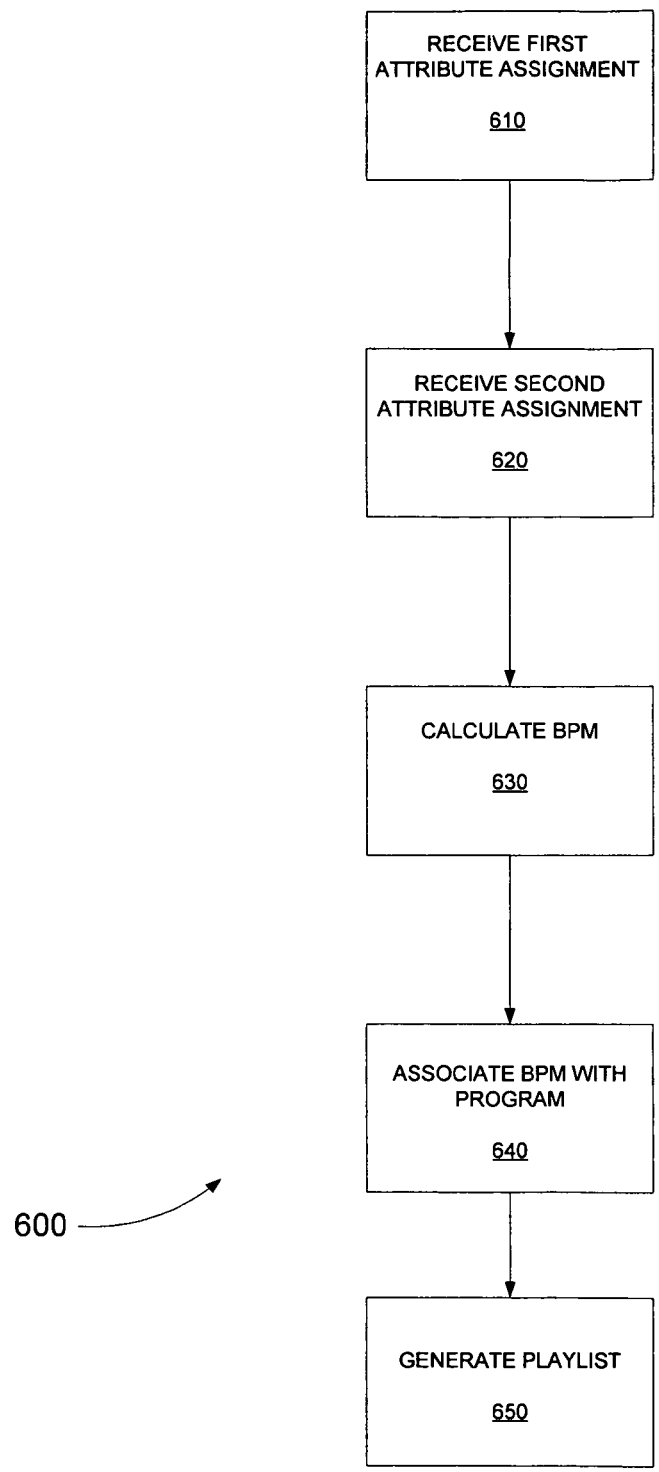
FIG. 6 is a flow diagram illustrating a first method according to an embodiment of the invention.

FIG. 6 illustrates a process 600 according to an embodiment of the invention. The process 600 is illustrated as a set of operations shown as discrete blocks. The process 600 may be implemented in any suitable hardware, software, firmware, or combination thereof. The order in which the operations are described is not to be necessarily construed as a limitation.

At a block 610, the device 100 receives from a user via the user interface a first user-perceived-attribute assignment corresponding to a first value describing at least a portion of a first media program of a plurality of media programs. For example, the assignment may comprise a selection by the user of the "Relaxed" radio button associated with the pace menu 380 to indicate that the program in question has a relaxed pace. As described above, this selection of "Relaxed" has a corresponding numerical value of 5 BPM.

At a block 620, the device 100 receives from a user via the user interface a second user-perceived-attribute assignment corresponding to a second value describing at least a portion of the first media program. For example, the assignment may comprise a selection by the user of the "Hot" radio button associated with the start menu 390 to indicate that the program in question has a strong beginning. As described above, this selection of "Hot" has a corresponding numerical value of 7 BPM.

At a block 630, the device 100, based on the first and second values, calculates a third value. For example, the device 100, based on profiling by the user, as described above, calculates a perceived BPM associated with the program.

At a block 640, the device 100 associates the third value with the first media program. For example, the device 100 may store the perceived BPM as a data field associated with the program.

The process performed in blocks may be performed with respect to a second media program, as well as succeeding programs. As such, at a block 650, the device 100, using, for example, the respective calculated BPMs, generates a playlist comprising the first and second media programs.

Figure 7:
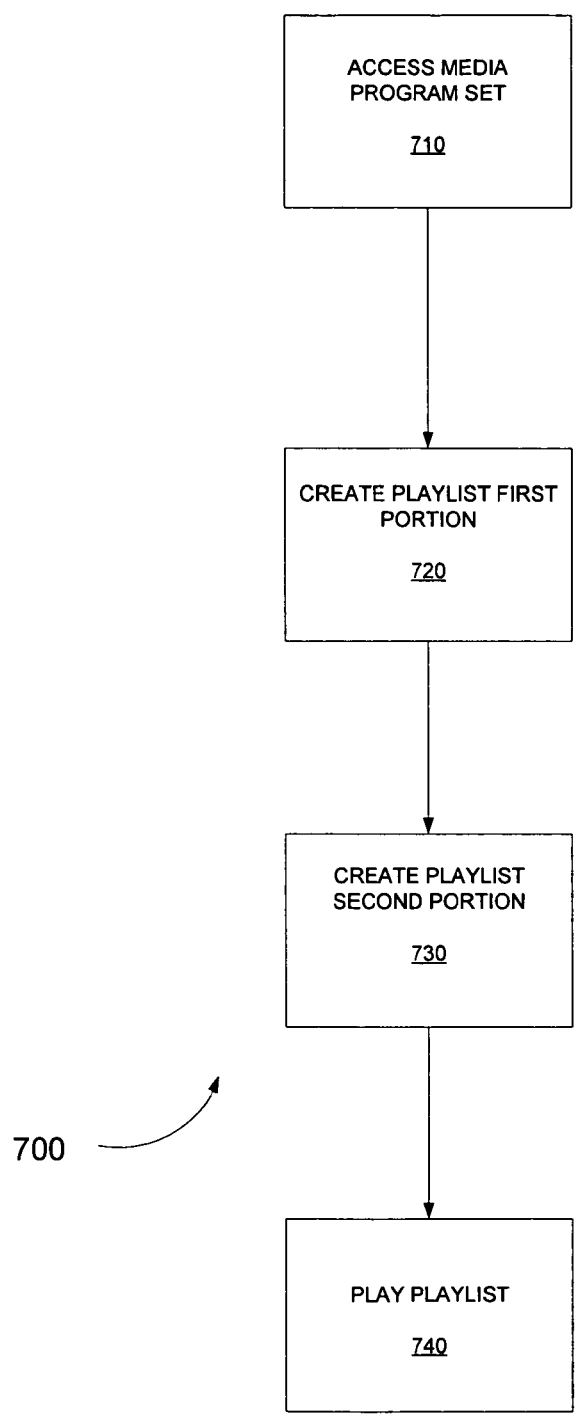
FIG. 7 is a flow diagram illustrating a second method according to an embodiment of the invention.

FIG. 7 illustrates a process 700 according to an embodiment of the invention. The process 700 is illustrated as a set of operations shown as discrete blocks. The process 700 may be implemented in any suitable hardware, software, firmware, or combination thereof. The order in which the operations are described is not to be necessarily construed as a limitation.

At a block 710, a set of media programs is accessed. For example, the composer module 220 may access a collection of songs stored, for example, in the memory 104. Alternatively, the accessed songs could be stored in, for example, a remote server (not shown) via a communication connection 112.

At a block 720, the composer module 220 creates a playlist first portion including a first plurality of the media programs of the set, the programs of the first portion being arranged with respect to one another according to a respective first characteristic value of each of the programs of the first portion. For example, the composer module 220 may generate a first playlist cycle in the manner described above.

At a block 730, the composer module 220 creates a playlist second portion including a second plurality of the media programs of the set, the programs of the second portion being arranged with respect to one another according to the respective first characteristic value of each of the programs of the second portion. For example, the composer module 220 may generate a second playlist cycle in the manner described above.

At a block 740, the first and second portions may be played via the output device 116. For example, the second portion may be played after the first portion and presented via audio speakers.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. For example, the media programs profiled and placed into playlists could be video files, as well. Thus, the present invention is not intended to be limited to the embodiments shown, but is to be accorded the widest scope consistent with the principles and features disclosed herein.

The invention claimed is:

1. A method for using a computer system having at least one output device, the method comprising:
   accessing a set of media programs;
   characterizing a tempo attribute for each of the media programs in the set of media programs;
   selecting a pace attribute for each of the media programs in the set of media programs;
   modifying the tempo attribute for each of the media programs in the set of media programs based on the pace attribute selected for each of the media programs in the set of media programs;
   characterizing a starting attribute and an ending attribute for each of the media programs in the set of media programs;
   determining a characteristic value for profiling each of the media programs in the set of media programs; and
   generating a playlist from the set of media programs, wherein the playlist is configured as a series of listening cycles, and wherein the listening cycles are playable for an amount of time.

2. The method of claim 1 wherein the media programs are songs.

3. The method of claim 1 wherein at least some of the media programs from the set of media programs are stored in the computer system.

4. The method of claim 1 wherein a subsequent listening cycle in the series of listening cycles starts with a media program having a tempo attribute that is equal to or lower than an ending media program of a prior listening cycle.

5. The method of claim 4 wherein a starting tempo attribute of an average tempo attribute from one listening cycle to another listening cycle increases for each subsequent listening cycle.

6. The method of claim 1, further comprising determining a standard deviation of tempo attributes from all of the media programs in the set of media programs.

7. The method of claim 6, further comprising, based on the standard deviation, determining a tempo value to be applied to a subsequent listening cycle.

8. The method of claim 5 wherein the tempo attribute for each of the media programs in the set of media programs includes a beats per minute estimate.

9. The method of claim 1, further comprising selecting a genre for each of the media programs in the set of media programs.

10. The method of claim 1 wherein a subsequent listening cycle in the series of listening cycles starts with a media program having a tempo attribute that is equal to or higher than an ending media program of a prior listening cycle.

11. A method for using a computer system to generate a playlist, the method comprising:
  accessing a set of media programs;
  ingesting, into the computer system, a plurality of attributes for each media program in the set of media programs, wherein the plurality of attributes includes at least a tempo attribute and a pace attribute, wherein at least one of the plurality of attributes were previously assigned by someone other than an end-user;
  computing a characteristic value for each of the media programs in the set of media programs; and
  generating a playlist from the profiled set of media programs, wherein the playlist is configured as a series of listening cycles, and wherein each listening cycle is playable by the end-user for an amount of time.

12. The method of claim 11 wherein the plurality of attributes further includes a starting attribute for each of the media programs in the set of media programs.

13. The method of claim 11 wherein the plurality of attributes further includes an ending attribute for each of the media programs in the set of media programs.

14. The method of claim 11 further comprising modifying the tempo attribute for each of the media programs in the set of media programs based on the pace attribute for each of the media programs in the set of media programs.

15. The method of claim 11 wherein the media programs are songs.

16. The method of claim 11 wherein the plurality of attributes further includes a genre attribute for each of the media programs in the set of media programs.

17. The method of claim 11 further comprising selecting a genre for the set of media programs before ingesting.

* * * * *